United States Patent
Chandrasekaran et al.

(10) Patent No.: US 8,086,579 B1
(45) Date of Patent: Dec. 27, 2011

(54) SEMANTIC RESPONSE TO LOCK REQUESTS TO REDUCE COHERENCE OVERHEAD IN MULTI-NODE SYSTEMS

(75) Inventors: Sashikanth Chandrasekaran, Belmont, CA (US); Roger J. Bamford, Woodside, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1448 days.

(21) Appl. No.: 10/056,716

(22) Filed: Jan. 22, 2002

(51) Int. Cl.
*G06F 7/00* (2006.01)
*G06F 17/00* (2006.01)
*G06F 17/30* (2006.01)

(52) U.S. Cl. .................. 707/704; 707/703; 707/689
(58) Field of Classification Search .............. 707/8, 203, 707/1, 202; 718/104; 710/200; 716/146; 701/221
See application file for complete search history.

(56) References Cited

U.S. PATENT DOCUMENTS

| | | | |
|---|---|---|---|
| 4,438,494 A | 3/1984 | Budde et al. | |
| 4,814,971 A | 3/1989 | Thatte | |
| 5,285,528 A * | 2/1994 | Hart | 710/200 |
| 5,410,697 A | 4/1995 | Baird et al. | |
| 5,440,732 A | 8/1995 | Lomet et al. | |
| 5,454,108 A * | 9/1995 | Devarakonda et al. | 710/200 |
| 5,524,205 A | 6/1996 | Lomet et al. | |
| 5,551,046 A | 8/1996 | Mohan et al. | |
| 5,596,754 A | 1/1997 | Lomet | |
| 5,659,682 A | 8/1997 | Devarakonda et al. | 395/184.01 |
| 5,682,537 A | 10/1997 | Davies et al. | |
| 5,721,943 A * | 2/1998 | Johnson | 713/300 |
| 5,832,484 A | 11/1998 | Sankaran et al. | |
| 5,933,838 A | 8/1999 | Lomet | |
| 5,933,849 A | 8/1999 | Srbljic et al. | 711/118 |
| 5,966,706 A | 10/1999 | Biliris et al. | |
| 5,999,940 A | 12/1999 | Ranger | 707/103 |
| 6,012,085 A | 1/2000 | Yohe et al. | 709/217 |
| 6,026,474 A | 2/2000 | Carter et al. | |
| 6,032,188 A | 2/2000 | Mairs et al. | 709/234 |
| 6,067,550 A | 5/2000 | Lomet | |
| 6,115,715 A | 9/2000 | Traversat et al. | 707/100 |
| 6,151,607 A | 11/2000 | Lomet | |
| 6,243,814 B1 | 6/2001 | Matena | 713/200 |
| 6,272,491 B1 | 8/2001 | Chan et al. | |
| 6,336,134 B1 * | 1/2002 | Varma | 709/205 |
| 6,353,836 B1 * | 3/2002 | Bamford et al. | 707/203 |

(Continued)

OTHER PUBLICATIONS

Norvag, Kjetil, "Issues in transaction-time temporal object database systems", Oct.-Dec. 2001, Journal of Database Management v12, n4, pp. 40-51.

(Continued)

*Primary Examiner* — Susan Y Chen
(74) *Attorney, Agent, or Firm* — Hickman Palermo Truong & Becker LLP

(57) ABSTRACT

Techniques are provided for lock management. The techniques are based on an enhanced lock management system that generates a semantic response in response to lock requests for a resource. The semantic response communicates both the underlying cause blocking the request, and information that may be used by the requester to obtain notification of when the underlying cause should no longer lead to denial of the lock request. The semantic response may be generated by the master of the resource, who provides the semantic response to the local lock manager of the lock requester. The semantic response may be retained by the local lock manager so that the semantic response can be provided to subsequent lock requesters, without need for interacting with another lock manager on another node.

14 Claims, 8 Drawing Sheets

U.S. PATENT DOCUMENTS

| | | | |
|---|---|---|---|
| 6,374,264 | B1 | 4/2002 | Bohannon et al. |
| 6,434,555 | B1 | 8/2002 | Frolund et al. |
| 6,449,623 | B1 | 9/2002 | Bohannon et al. |
| 6,453,356 | B1 | 9/2002 | Sheard et al. ............... 709/231 |
| 6,453,404 | B1 | 9/2002 | Bereznyi et al. |
| 6,490,594 | B1 | 12/2002 | Lomet |
| 6,529,906 | B1 | 3/2003 | Chan |
| 6,587,921 | B2 | 7/2003 | Chiu et al. |
| 6,668,295 | B1 * | 12/2003 | Chan ............................ 710/200 |
| 6,816,873 | B2 | 11/2004 | Cotner et al. |
| 6,832,120 | B1 | 12/2004 | Frank et al. ..................... 700/65 |
| 6,915,387 | B1 | 7/2005 | Huffman et al. |
| 6,920,454 | B1 | 7/2005 | Chan |
| 7,085,911 | B2 | 8/2006 | Sachedina et al. |
| 2004/0225742 | A1 | 11/2004 | Loaiza et al. |
| 2005/0149540 | A1 | 7/2005 | Chan et al. |

OTHER PUBLICATIONS

Written Opinion from PCT Patent Application No. PCT/US02/06981 dated Oct. 3, 2004(8 pgs.).
Current Claims in PCT Patent Application No. PCT/US02/06981 (8 pgs.).
Office Action from Canadian Patent Application No. 2,448,050 dated Oct. 1, 2004 (2 pgs).
Current Claims in Canadian Patent Application No. 2, 448,050 (48 pgs).
U.S. Appl. No. 09/746,580, filed Dec. 20, 2000.
U.S. Appl. No. 09/798,618, filed Mar. 1, 2001.
U.S. Appl. No. 09/798,617, filed Mar. 1, 2001.
U.S. Appl. No. 09/871,853, filed May 31, 2001.
U.S. Appl. No. 10/092,047, filed Mar. 4, 2002.
U.S. Appl. No. 10/091,618, filed Mar. 4, 2002.
U.S. Appl. No. 10/435,229, filed May 9, 2003.
U.S. Appl. No. 10/092,047, filed Mar. 4, 2002, Office Action Mailing Date Mar. 9, 2005.
Lory D. Molesky et al., "Database Locking Protocols for Large-Scale Cache-Coherent Shared Memory Multiprocessors: Design, Implementation and Performance," Jun. 6, 1995, pp. 1-24.
Lory D. Molesky et al., "Efficient Locking for Shared Memory Database Systems," Mar. 1994, 28 pages.
Rahm, E., "Concurrency and Coherency Control in Database Sharing Systems" (1993) pp. 1-62.
U.S. Appl. No. 09/798,618, filed Mar. 1, 2001, Office Action Mailing Date Mar. 7, 2006.
U.S. Appl. No. 10/091,618, filed Mar. 4, 2002, Office Action Mailing Date Jul. 7, 2005.
Andrew S. Tanenbaum. "Structured Computer Organization" (Second Edition) 1984, pp. 10-12.
U.S. Appl. No. 10/832,527, filed Apr. 26, 2004, Office Action Mailing Date Apr. 19, 2007.
U.S. Appl. No. 11/000,818, filed Nov. 30, 2004, Office Action Mailing Date Apr. 19, 2007.

* cited by examiner

SEMANTIC RESPONSE TO LOCK REQUESTS TO REDUCE COHERENCE OVERHEAD IN MULTI-NODE SYSTEMS

FIELD OF THE INVENTION

The present invention relates to lock management, and in addition, to efficiently resolving contention for locks on resources.

BACKGROUND OF THE INVENTION

One technique for increasing scalability in database systems is to allow multiple nodes to access and modify a single database. A multiple-node system may comprise a single computer with multiple processors, or multiple computers interconnected via a local area network, or a combination thereof. In a multiple-node system, a lock manager may include processes that are distributed over numerous nodes.

One or more database servers may run on the multiple nodes. A database server may include one or more processes. Database servers use and share resources ("shared resources") while executing transactions. Examples of shared resources include data blocks, tables, and rows. A page is copy of data block loaded into a cache.

Even though resources may be shared between database servers, many resources may not be accessed in certain ways by more than one process at any given time. For example, resources such as data blocks of storage mediums may be concurrently accessed in some ways (e.g. read) by multiple processes, but accessed in other ways (e.g. written to) by only one process at a time. Consequently, mechanisms have been developed which control access to resources.

One such mechanism is referred to as a lock. A lock represents that a particular process has been granted certain rights with respect to a resource. There are many types of locks. For example, a shared type lock may be shared on the same resource by many processes, while an exclusive type lock prevents any other type of lock from being granted on the same resource.

The entity responsible for granting locks on resources is referred to as a lock manager. In a single node database system, a lock manager will typically consist of one or more processes on the node. A lock manager that includes components that reside on two or more nodes is referred to as a distributed lock manager.

FIG. 1 is a block diagram of a multiple-node computer system 100. Each node has stored therein a database server and a portion of a distributed lock management system 132. Specifically, the illustrated system includes three nodes 102, 112, and 122 on which reside database servers 104, 114, and 124, respectively, and lock managers 106, 116 and 126, respectively. Database servers 104, 114 and 124 have access to the same database 120. The database 120 resides on a disk 118 that contains multiple blocks of data. Disk 118 generally represents one or more persistent storage devices which may be on any number of machines, including but not limited to the machines that contain nodes 102, 112 and 122.

According to one approach to distributed lock management, distributed lock management system 132 includes one lock manager for each node that contains a database server. Each lock manager manages access to a subset of the shared resources. A lock manager is referred to as a master with respect to a resource for which the lock manager manages access. If resource R1 is managed by lock manager 106, then lock manager 106 is the master of resource R1. A lock manager is also referred to as a local lock manager with respect to the node on which the lock manager resides. Thus, lock manager 106 is a local lock manager with respect to node 102.

Before a process can access a shared resource, it must obtain the appropriate lock on the resource from distributed lock management system 132. The process issues a request for a lock on a shared resource to distributed lock management system 132. The request specifies a lock name and lock type. The lock name is data that identifies a resource, such as a data block number, a table-id or name, a row-id, or a transaction-id.

Distributed lock management system 132 must determine whether the requested lock is consistent with any lock granted for the resource, if any. If the requested lock is not consistent with the granted lock, then the requester must wait until the process holding the granted lock releases the granted lock.

A process issues a lock request for a resource to its local lock manager. If the local lock manager is not the master of the resource, the local lock manager issues a request for the lock to the master of the resource. The master determines whether the requested lock may be granted, and transmits a response to the local lock manager indicating whether the lock has been granted. The local lock manager updates data structures it maintains to indicate that the lock has been granted to the requesting process. The local lock manager then transmits a lock request response to the requesting process.

Another approach to distributed lock management uses a global lock manager. A global lock manager coordinates requests for locks issued between local lock managers by creating global locks on shared resources. The global locks are granted in tandem with locks granted by local lock managers for shared resources. The global lock manager and local lock managers work together to ensure that a global lock is consistent with the locks granted by the local lock manager, and vice versa.

Lock Contention

One of the longstanding problems in the area of lock management is lock contention. Lock contention refers to multiple processes competing for the same locks. The following is provided as an example of lock contention. A process P1 has been granted an exclusive lock on a shared resource by lock manager 106. While process P1 has the lock, processes P2 and P3 issue requests for a shared lock on the shared resource. Because process P1 has the exclusive lock, the lock requests of process P2 and P3 are denied. Process P2 and P3 are referred to as being blocked because their lock requests cannot be granted.

A blocked process may not be able to proceed without obtaining the lock that the process unsuccessfully requested. The task being executed by a blocked process may be delayed, or abandoned altogether and possibly re-attempted at a later time. Thus, lock contention can impede completion of tasks and degrade system performance. Problems caused by lock contention are aggravated when lock contention impedes the execution of critical tasks that are vital to computer system performance and integrity.

B-Tree and B-Tree Split Operations Adversely Affected by Lock Contention

One example of a critical operation adversely affected by lock contention is a block split operation performed on a block in a b-tree table index in a database system. Before explaining a block split operation and how it may be adversely affected by lock contention, it is useful to describe an illustrative b-tree index.

According to one approach for B-tree indexes, a b-tree index consists of a set of data blocks linked in a hierarchical arrangement. A b-tree index contains two types of blocks: branch blocks and leaf blocks. Leaf blocks reside at the lowest level of the hierarchy and contain entries that hold key values from the actual indexed key values. For example, b-tree index 208 is an index for a "key column" of a table. Block 234 of b-tree index 208 is a leaf block that contains entries that hold key values from the key column. Along with the key values, leaf block entries store row-ids of rows that contain the key values. Leaf block 234 contains an entry that maps the name ISSAACS to row-id 4876.

All the blocks in b-tree index 208 that are not leaf blocks are branch blocks. Branch blocks contain data that indicate a range of key values. In the illustrated b-tree index 208, blocks 210, 212, 214, 216, 220, 222, 224, 226, 232 and 236 are branch blocks, and therefore correspond to ranges of key values. The range of key values identified in each branch block is such that all blocks that reside below a given branch block correspond to key values that fall within the range of key values represented by the branch block. For example, block 214 is a branch block that corresponds to names in the alphabetic range from Franklin to Miner. Consequently, branches 220, 222, 224, 232, 234, and 236 which all reside below block 224 in the hierarchy, correspond to key values that fall within the range of Franklin to Miner. Reference numerals 228, 226, 228, 230, 238 and 240 represent connections to other portions of b-tree index 208 that are not shown.

To find a row-id of a key value, a database server traverses b-tree index 208. The traverse of b-tree index 208 is illustrated in an example that involves finding the row-id of ISAACS. The traversal of b-tree index 208 is initiated by a database server obtaining a shared lock on block 210. The database server reads block 210 to determine the range identified by the block that corresponds to ISAACS, and the branch block at the next level of the b-tree index that corresponds to the range. In this case the branch block is block 214. The database server obtains a shared lock on block 214 and then releases the shared lock on block 210. After reading the block 214, the database server determines that the block at the next level that corresponds to the range for ISAACS is block 222. The database server obtains a shared lock on block 222 and then releases the shared lock on block 214, and determines that the leaf block that corresponds to the range for ISAACS is block 234. The database server then obtains a shared lock on block 234, releases the shared lock on 222, and reads block 234 to determine that the row-id that corresponds to ISAACS is 4876.

As key values are added to the column indexed by the b-tree index, entries corresponding to those key values are added to the appropriate leaf blocks. Leaf blocks can only hold so many entries. Thus, when adding a key value to a leaf block, a determination is made about whether or not the leaf block may hold another entry. If not, a block split operation is performed to add a new leaf block to index.

A block split operation involves a variety operations. These include moving some of the entries of the "full" leaf block into the new leaf block. The parent block is also modified to identify the new range for the new block and alter the range for the previously full block. Adding a new range to a parent branch block may involve performing block split operations on a branch block, which are performed in a manner similar to that described for a leaf block. A block having the entries that are transferred to another block during a block split operation are referred to herein as a split block.

If the block split operation cannot be completed, then modifications to the parent block are left incomplete. The parent branch block may identify the wrong range for a leaf block, and may not even identify any range for a new leaf block. Such errors affect the indexed key values of multiple rows. If a block split operation involves branch blocks in the higher levels of a b-tree index, then vast ranges of indexed key values may even be lost. For this reason, a block split operation is critical.

Block Split Operation Protocols

In database systems, many processes may concurrently access a b-tree index to traverse the index to find the row-ids of key values, insert key values, and perform block split operations. Because the block split operation is critical, and may occur when inserting key values into a b-tree index, special protocols are used to insert key values into a b-tree index.

Referring to FIG. 3, at step 302, a process gets a shared lock on a branch block. At step 304, the process determines whether the child block of the branch block is a leaf block or branch block. If a child block is a branch block, then at step 306, the process gets a shared lock on the child branch block and at step 308 releases the shared lock on the parent block. If the child block is a leaf block, then execution proceeds to step 310.

At step 310, the process gets an exclusive lock on the leaf block.

At step 312, the process releases the shared lock on the parent block.

At step 316, the process reads the leaf block.

At step 320, the process determines whether the leaf block is marked for split by a block split operation. A block may be marked for a block split operation at a step that is later described. If the leaf block is marked for split, then at step 324, the process releases the exclusive lock on the leaf block, ceases execution of the steps to wait and then re-attempt to insert the key value by initiating a traversal of the b-tree again at step 302.

If the leaf block is not marked for split, then at step 330, the process determines whether the leaf block is full. If the leaf block is not full, then at step 334, a key value entry is added to the leaf block, and the shared lock of the leaf block is released. Execution of the steps ceases. If the leaf block is full, then execution proceeds to step 340.

At step 340, the process marks the leaf block for split by adding data to the block.

At step 344, the process releases the exclusive lock on the leaf block.

At step 348, the process gets an exclusive lock on the parent block.

At step 350, the process modifies the parent block. The modifications include changes to the identified ranges in the parent block that are needed for the block split operation as described earlier. Also, it is possible that the parent block may be full and cannot accommodate a new range entry. However, for purposes of exposition, a process for handling this situation is not specifically described.

At step 356, the process gets an exclusive lock on the leaf block. At step 360, a new leaf block is "created."

At step 364, the leaf block is modified to remove some of the entries and transfer the entries to the new leaf block. The steps end so that the steps may be re-attempted to insert the key value. The block is later unmarked when the process is committed or otherwise terminated.

By marking the leaf block for a split operation, modifications made by other processes to the block are serialized. In some systems, accesses to read the block may also be serialized. The other processes, by adhering to the insert key protocol, will not modify (or read) a marked block because of the determination made at step 320. Furthermore, the block will not be modified by another process until the process that marked the block has split the block, and the transaction being executed by the process is terminated. In this way, marking a block for a block split operation serializes modifications to the block, giving a higher a priority to the marker of the block.

Concurrent Inserts of Keys Hampered by Need to Ping Block

For multiple processes A and B that are using the above protocol to insert a key value, it is possible that a process A, after marking a leaf block for split at step 340, may be attempting to get an exclusive lock on the parent block at step 356, while a process B has a shared lock on the parent block, after obtaining the lock at step 302. Process A cannot proceed until process B determines that the leaf block has been marked for split at step 314, and releases the lock on the leaf node at step 324.

As shown above, a process attempting to split a block may have to wait until the block has been examined by one or more processes that are concurrently attempting to insert a key value. Such delay and overhead may be aggravated in a parallel database system, where the processes attempting to insert a key value into a leaf block may be executing on different nodes, and where the blocks transferred between nodes are pinged.

A ping is a transfer of information stored in the buffer cache of one node to another node. Pings are very expensive and may have numerous lock-related operations.

In parallel database systems, leaf blocks being split may have to be pinged to multiple nodes before the split can be performed. Obviously, this causes a great deal of overhead, especially when split operations occur in "hot spots" of a b-tree index. A hot spot is a set of data items to which data access is concentrated. A hot spot for a b-tree can be a set of blocks where key value insertions are concentrated. For example, a b-tree index may index key values that are sequentially generated integers. Insertions of a key value by multiple processes could be concentrated in the same leaf block.

Blocks in a b-tree are just one illustration of a pinged data item that is marked for the purpose of communicating to another that the data item is undergoing a critical operation. Another example occurs in the area of space management, where table and index headers are marked with a space management status to serialize space reorganization between multiple transactions. Table and index headers are pinged data items that can be hotspots.

Based on the foregoing, it is clearly desirable to provide a mechanism that alleviates the overhead caused by pinging data items that are marked in order to communicate their state or the state of an operation being performed on them.

SUMMARY OF THE INVENTION

Techniques are provided for lock management. According to an embodiment of the present invention, the techniques are based on an enhanced lock management system that generates a semantic response in response to lock requests for a resource. The semantic response communicates both the underlying cause blocking the request, and information that may be used by the requester to obtain notification of when the underlying cause should no longer lead to denial of the lock request. The semantic response may be generated by the master of the resource, who provides the semantic response to the local lock manager of the lock requester. The semantic response may be retained by the local lock manager so that the semantic response can be provided to subsequent lock requesters, without need for interacting with another lock manager on another node.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for lock management is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

In conventional lock management, a lock request is issued to a lock manager for a lock, and the lock manager returns a response about the lock request. The information provided by the response is typically limited to the status of the lock request; the response may indicate that the lock was granted, denied, or that the request had "timed out". When the request cannot be granted, lock requests issued by conventional lock managers convey no information about the underlying cause that prevented the grant of the lock request. Information about the underlying cause is communicated, if at all, through some mechanism other than the lock request response. For example, the fact that a block split operation is being performed is communicated by marking the block split to indicate that it is undergoing a block split operation.

A blocking condition, as the term is used herein, is any condition that prevents a process from acquiring a particular type of lock on a resource or accessing the resource in some particular way. An example of a blocking condition is the performance of a block split operation. The performance of a block split operation causes a process to mark a block to be split, thereby preventing other processes from modifying the block. Another example of a blocking condition is a process reading a data block as part of a table scan operation. The process acquires a shared lock in order to access the block. The shared lock prevents issuance of an exclusive lock request requested by another process. The read operation and table scan operation are therefore blocking conditions.

Described herein is a mechanism for enhancing the semantics of a response to a lock request. The semantics of a lock request response are enhanced to provide (1) information about the underlying cause of a blocked request, and/or (2) information that a blocked requester may use to invoke a mechanism that will notify the requester of when the blocking condition is no longer effectual. A blocking condition is no longer effectual if it should not prevent acquisition of a previously blocked lock request.

Figure 4:
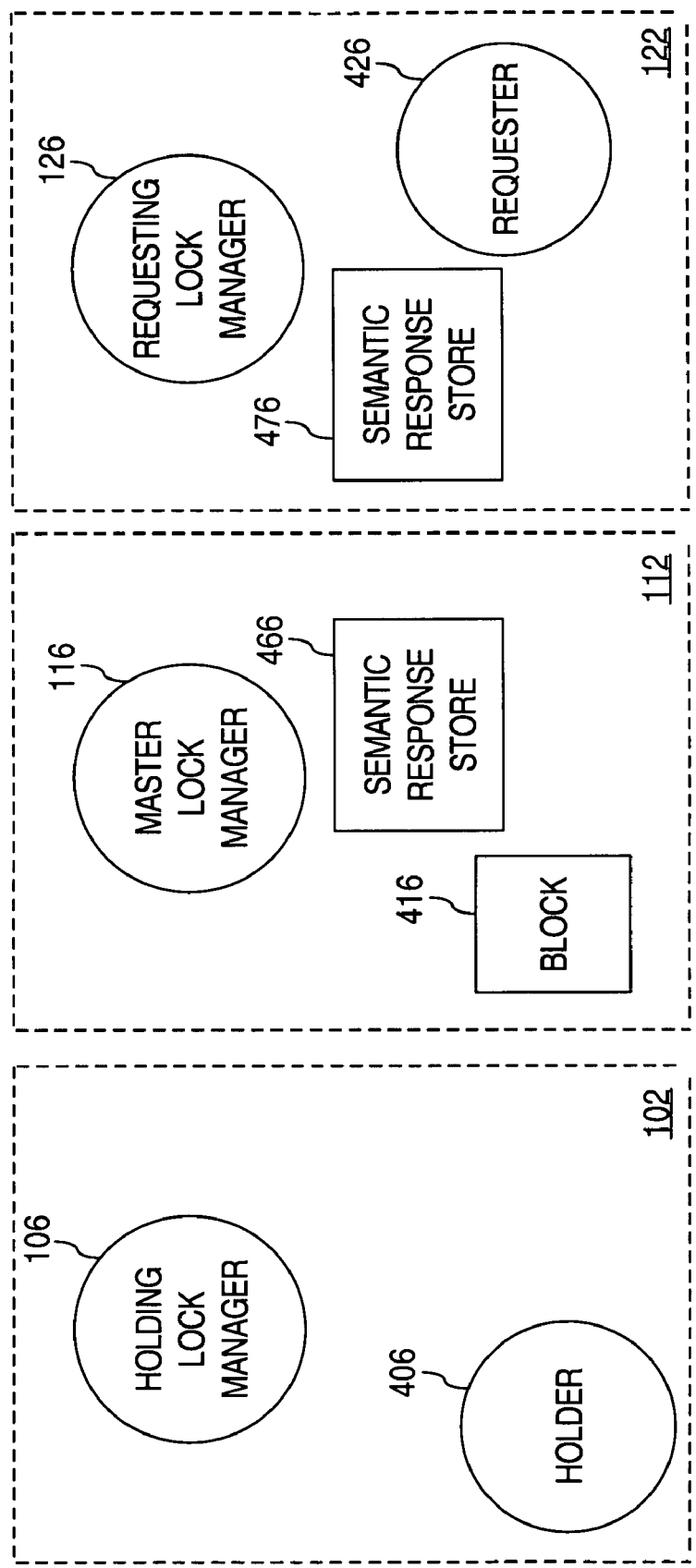
FIG. 4 is a block diagram depicting a distributed lock management system according to an embodiment of the present invention.
Figure 5:
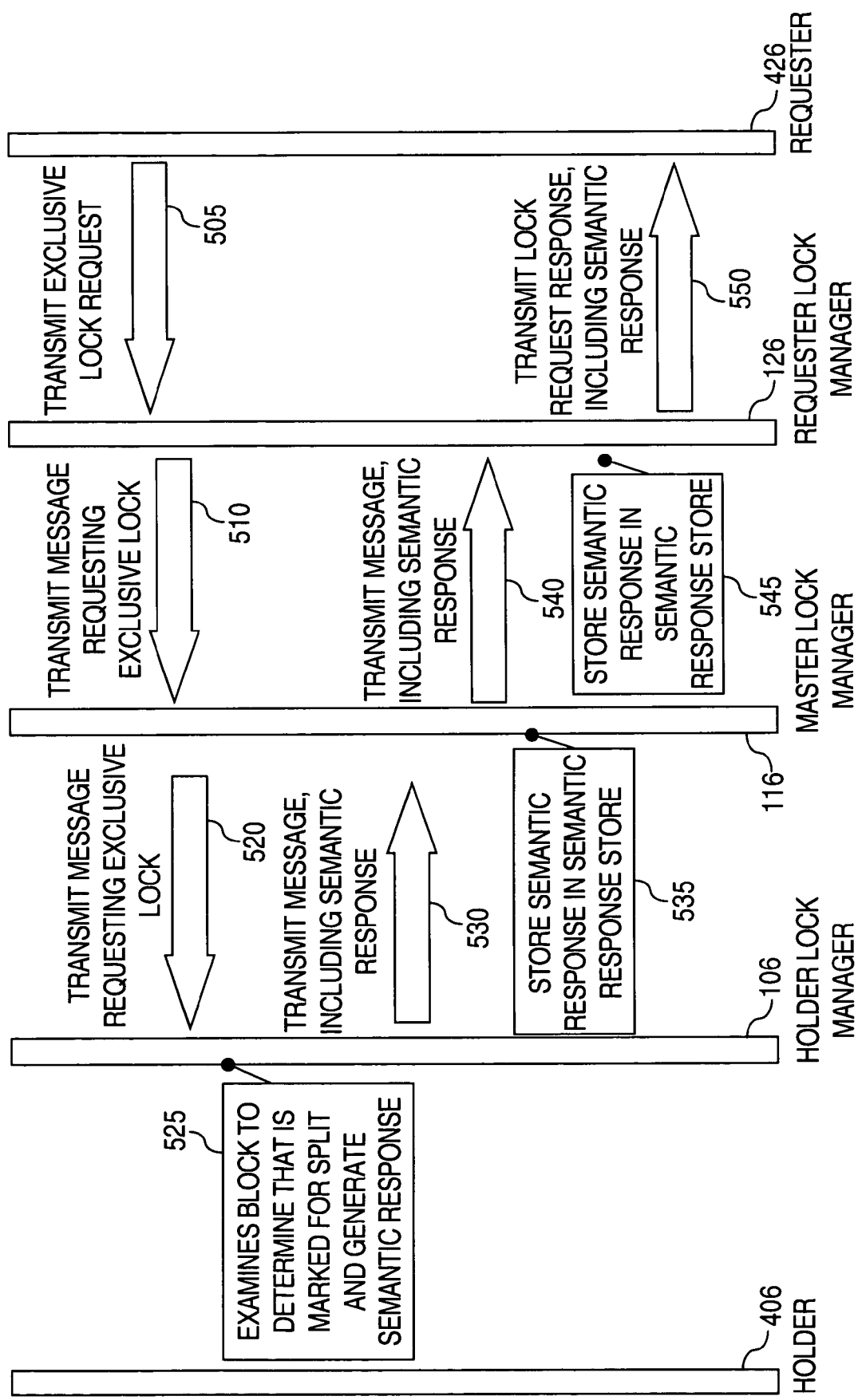
FIG. 5 is a process interaction diagram showing actions and interactions by a distributed lock manager that uses semantic lock responses to interact with processes seeking locks on resources according to an embodiment of the present invention.
Figure 6:
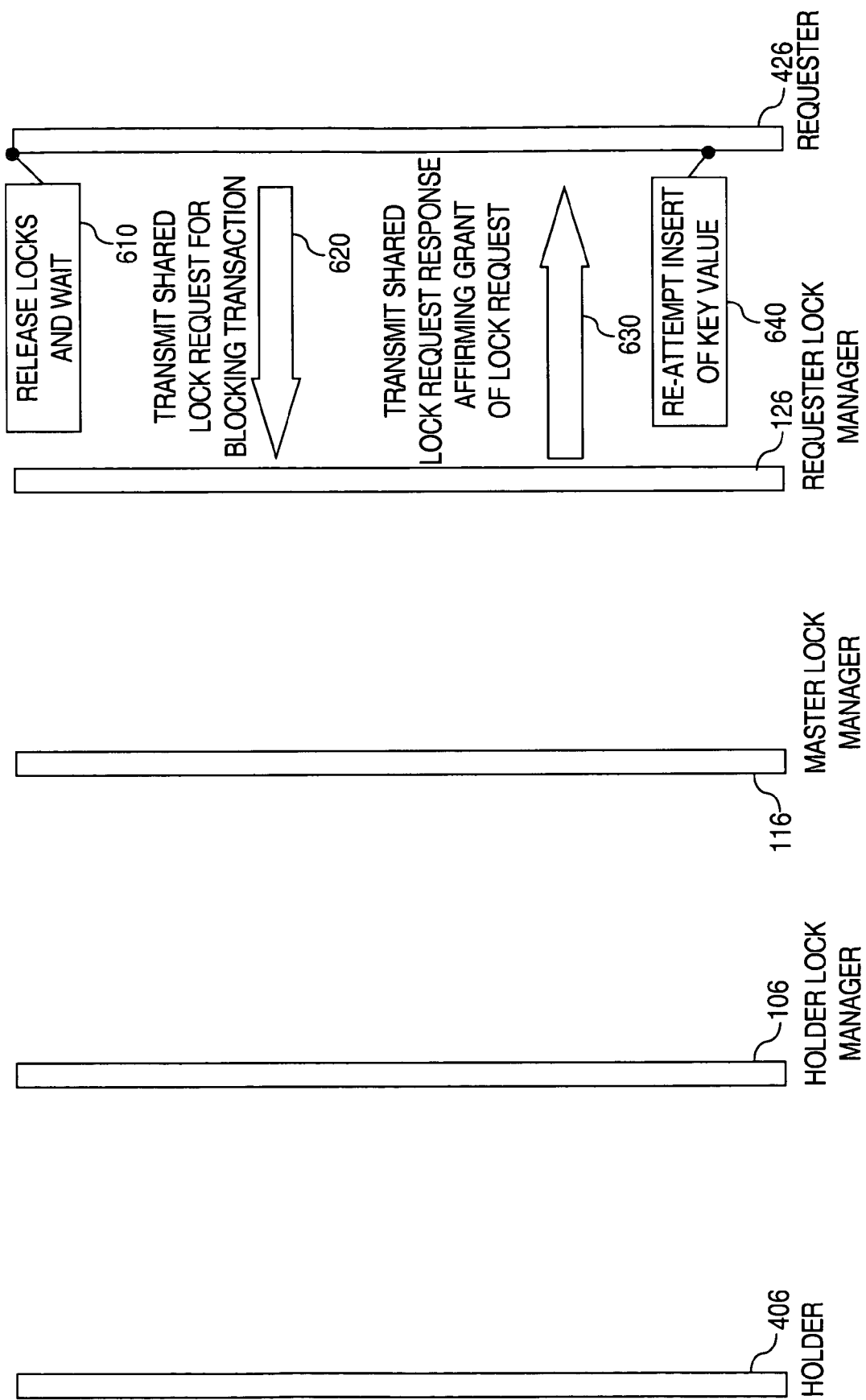
FIG. 6 is a process interaction diagram showing actions and interactions by a distributed lock manager that uses a semantic lock response to interact with processes seeking locks on resources according to an embodiment of the present invention.
Figure 7:
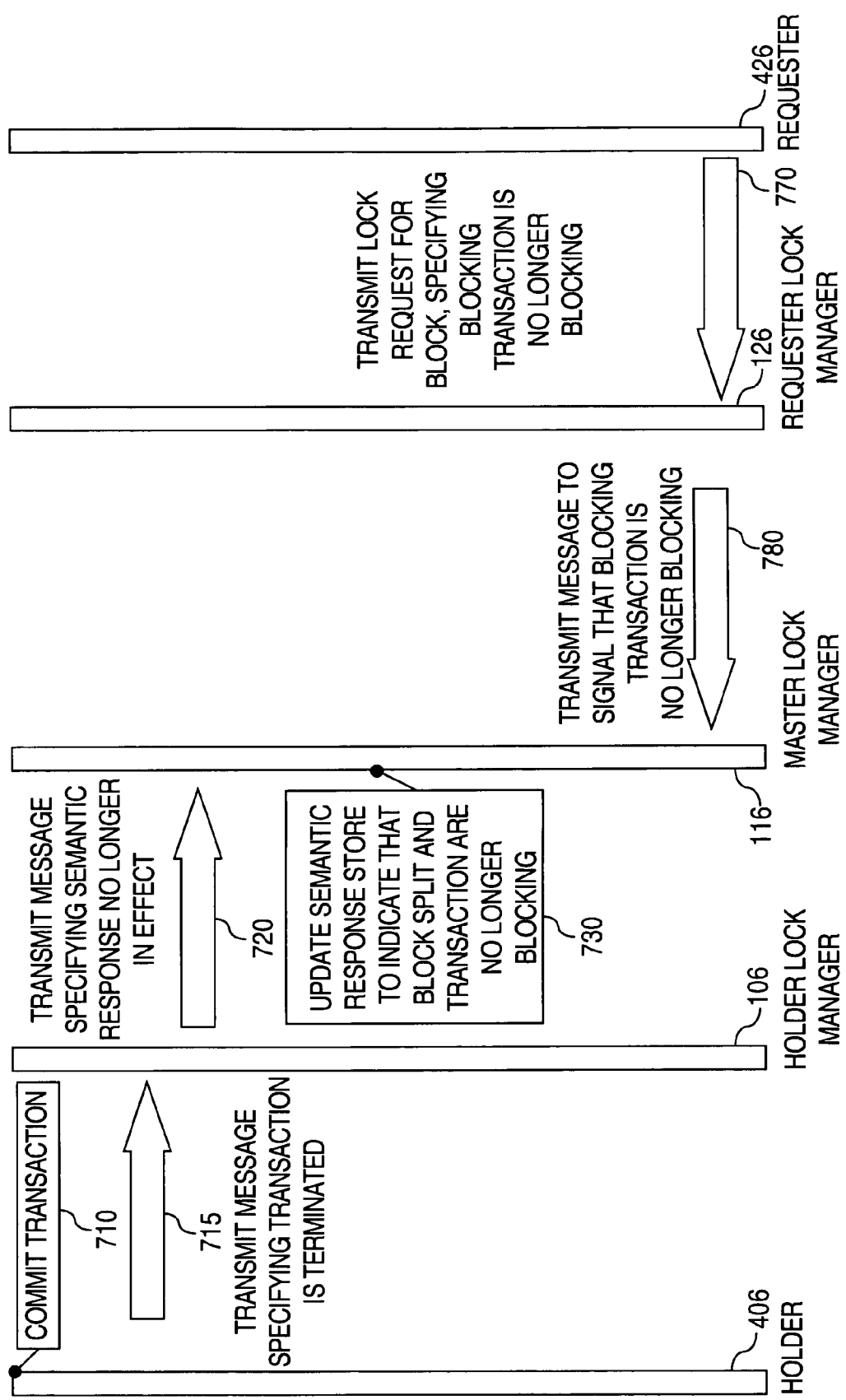
FIG. 7 is a process interaction diagram showing actions and interactions by a distributed lock manager that uses a semantic lock response to interact with processes seeking locks on resources according to an embodiment of the present invention.

FIG. 4 is a block diagram showing processes and other entities involved in an illustration of an embodiment of the present invention. FIGS. 5, 6, and 7 show process interaction diagram 500, 600, and 700, respectively, which depict interaction that occurs between processes and operations performed by them to respond to a lock request which cannot be granted because of a block split operation. Diagram 500 shows the interaction and processing that occurs to generate an enhanced semantic lock request response. Diagram 600 shows how a requester who receives a lock request response may act upon the response.

Referring to FIG. 4, it shows lock manager 106, lock manager 116 and lock manager 126, which are also referred to herein in this illustration as holder lock manager 106, master lock manager 116, and requester lock manager 126, respectively. Each of these lock managers are actors in an illustration who play a particular role in a block split operation being performed upon block 416. These lock managers are referred to herein by the role they play to facilitate describing the illustration.

Holding lock manager 106 is the local lock manager of holder 406. Holder 406 is a process running on node 102 that has marked block 416 for a block split operation. Holder 406 is performing a block split operation by following a modified version of the insert key protocol depicted in FIG. 3. Modifications to the protocol are highlighted hereafter. After having marked block 416 at step 340 and releasing the exclusive lock of the block at step 344, holder 406 is attempting to acquire an exclusive lock on the parent of block 416. Holder 406 is referred to as "holding" because it holds a higher priority to modify block 416 as a result of marking the block. Likewise, holder lock manager 106 is referred to as holding because it is the local lock manager of a process holding the highest priority to modify block 416.

Master lock manager 116 is the master of block 416.

Requester lock manager 126 is the local lock manager of process requester 426. Requester 426, which is following the modified insert key protocol to insert a key value, has just determined at step 304 that block 416 is a child block that is a leaf block. Because it is a leaf block, the requester 426 needs to attempt to acquire an exclusive lock on block 416 in order to insert the key value. In lieu of step 310, requester 426 performs steps as indicated below.

Process interaction diagram 500, 600, and 700 shows the interactions between processes and steps performed by them in the following manner. Referring to diagram 500 as an example, holder lock manager 106, master lock manager 116, requester lock manager 126, and requester 426 are each represented by a bar. Messages transmitted between each of these processes are represented as an arrow from the bar of one process to the bar of another process. For example, message 505 is a message transmitted by requester 426 to requester lock manager 126. Steps performed by a process are described in blocks connected to the bar of the process. For example, step 540 describes operations performed by requester lock manager 126.

The relative height of the top of the arrows and blocks represents the relative order in which they occur. For example, after transmitting message 540, step 545 is performed, followed by the transmission of lock request response 550.

Referring to FIG. 5, requester 426 transmits exclusive lock request 505 to requester lock manager 126. Requester lock manager 126 transmits message 510 requesting the exclusive lock to master lock manager 116. Master lock manager 116 transmits message 520 requesting the exclusive lock to holder lock manager 106.

At step 525, the holder lock manager 106 examines block 416, to determine that it has been marked for split. In response to this determination, holder lock manager 106 creates a semantic response. The term semantic response, as used herein, is information that can be communicated to a requester of a lock in response to a lock request issued by the requester, where the information conveys the (2) underlying cause of a blocked request, and/or (2) information that a blocked requester may use to invoke a mechanism that will notify the requester of whether the blocking condition is no longer "effectual". In this illustration, the semantic response includes the lock name of the transaction ("blocking transaction") for which block 416 is being split. The lock name of the transaction is its transaction id. Holder lock manager 106 can determine the lock name of the blocking transaction by examining block 416.

The lock name may be used by requester 426 to request a shared lock on the blocking transaction. The ability to request a shared lock on the blocking transaction allows requester 426 to determine when the blocking transaction is terminated, and therefore, when the blocking condition that originally blocked the exclusive lock request for block 416 is no longer effectual. The process executing the transaction has an exclusive lock on the transaction until the transaction is terminated. Thus, if requester 426 is able to acquire a shared lock on the blocking transaction, then the transaction has terminated, and the block split operation is completed.

After step 525, holder lock manager 106 transmits message 530 to master lock manager 116. The message includes the semantic response.

After receiving message 530, at step 535, master lock manager 116 stores the semantic response in semantic response store 466. A semantic response store is a data structure used by a lock manager to store semantic responses for particular resources. In this illustration, semantic response store 466 maps block 416 to the lock name of block 416. For subsequent requests for locks on block 416, master lock manager 116 may examine semantic response store 466 to determine that a semantic response is stored for block 416, and that the requested lock should not be granted. The determination may be made without having to incur the overhead of interacting with holder lock manager 106 by transmitting a request for the exclusive lock to holder lock manager 106 and waiting for a response.

The master lock manager 116 transmits message 540 to requester lock manager 126. Message 540 includes the semantic response.

At step 545, requester lock manager 126 stores the semantic response in semantic response store 476. Storing a copy of the semantic response here allows the requester lock manager 126 to locally determine whether lock requests for block 416 may be granted, without having to interact with any other lock manager in the distributed lock management system 132.

Requester lock manager 126 transmits lock request response 550 to requester 426. The lock request response includes the semantic response. The lock response transmitted by lock managers may also include a lock request status and a lock value block. The lock request status indicates such information as whether the lock was granted, denied, or timed-out. The lock value block is used to communicate further information about the lock request. A lock value block may be used to communicate the semantic response.

FIG. 6 shows how requester 426 responds to semantically enhanced lock request response 565. At step 610, requester 426 releases the lock on the parent block. Next, it transmits a shared lock request 620 for a shared lock on the blocking transaction. Next, requester 426 receives the shared lock request affirming the grant of shared lock request 620. At step 640, requester 426 re-attempts the process of inserting the key value it was originally attempting to insert in the current illustration.

Signaling that a Blocking Condition is Ineffectual

As shown above, once the lock managers are informed of a semantic response for a block, the lock managers deny lock requests for the block. Eventually the blocking condition becomes ineffectual and no longer requires denial of lock requests for the block. When this occurs, the lock managers need to be notified so that blocked lock requests are no longer blocked on the basis of the blocking condition. FIG. 7 shows several ways of performing such notifications.

Referring to FIG. 7, at step 710, holder 406 commits the blocking transaction, and then transmits message 715 to holder lock manager 106. Message 715 specifies that the blocking transaction for block 416 is no longer effectual. Holder lock manager 106, in turn, transmits message 720 to master lock manager 116, which specifies that the semantic response for the blocking transaction is no longer in effect. At step 730, master lock manager 116 updates its semantic response store 466 to indicate that the semantic response is no longer in effect.

As mentioned before, requester 426 receives lock request response 630, affirming grant of a shared lock on the blocking transaction, and indicating to requester 426 that the transaction has terminated. Requester 426 may then issue another lock request for block 416 when re-attempting to insert a key value. It is possible that master lock manager 116 may receive a lock request for block 416 for requester 426 before master lock manager 116 receives message 720 and updates its semantic response store 466. Thus, semantic response store 466 may indicate that the semantic response is still in effect when master lock manager 116 receives a lock request for block 416. The lock request may be denied when in fact there is no longer a block split operation being performed on the block and no need to deny lock requests on the block.

To avoid this situation, a lock request may specify that the resource for which a lock is being requested should no longer be affected by a particular blocking condition. This avoids denial of a lock request based on a blocking condition that is no longer effectual.

In this case, lock request 770 may specify that the blocking transaction no longer requires denying block requests for block 416. Requester lock manager 126 updates its semantic response store 476 to indicate that the semantic response in issue is no longer in effect. This prevents requester lock manager 126 from denying lock requests based on ineffectual blocking conditions. Requester lock manager 126 then transmits message 780 to master lock manager 116 to indicate that the semantic response is no longer in effect. Master lock manager 116 updates its semantic response store 466.

ADVANTAGES, OTHER EMBODIMENTS AND SCENARIOS

There are numerous advantageous offered by a semantic lock response. For example, in the modified insert key protocol at step 348, a process may be acquiring an exclusive lock on the parent block of a block marked for split. Other processes, which are attempting to insert a key value into b-tree index 108, hold a shared lock on the parent and are requesting an exclusive lock on the marked block. The process does not have wait for the marked block to be communicated to the other processes holding the shared lock on the parent before they relinquish the shared lock. Instead, these processes relinquish the shared lock in response to receiving the semantic response provided in response to the exclusive lock request for the marked block. Even more, not only is this wait for the exclusive lock reduced, but overhead incurred by performing expensive ping related operations is eliminated. Since the marked block has not been pinged, the marked block may be left in the buffer cache of the process's node.

An embodiment of the present invention has been illustrated using an illustration where the lock managers participating in processing a lock request reside on different nodes. However, the present invention applies to scenarios where the one or more lock managers participating in processing a lock request do not all reside on separate nodes. For example, a master lock manager and a process performing a block split, may both reside on the same node. Other lock managers are informed when any of them requests the block while the semantic response is still in effect.

As mentioned before, a distributed lock manager may incorporate a global lock manager. The global lock manager receives lock requests and semantic response messages and maintains a semantic response store in a manner similar to that described for other lock managers.

In addition, the semantic lock responses are not limited to scenarios involving block split operations. A semantic response may be used in any circumstance where a lock requester, who may be denied a lock request because of a blocking condition, may use information about how to obtain notification of when a blocking condition can longer cause denial of a lock request.

Hardware Overview

Figure 8:
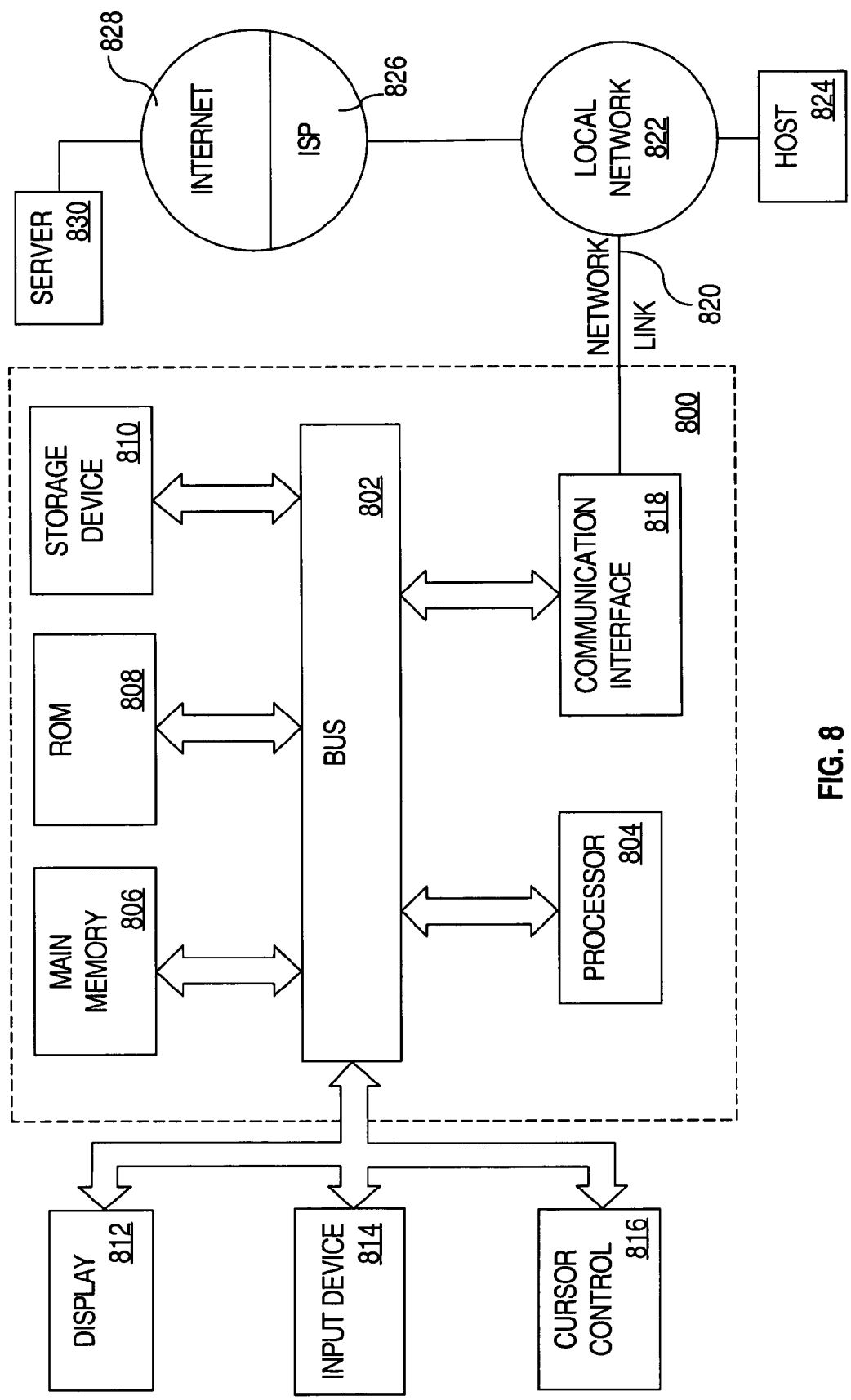
FIG. 8 is a computer system that may be used to implement an embodiment of the present invention.

FIG. 8 is a data item diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic persistent storage or optical persistent storage, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic persistent storages, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, the method comprising the steps of:
    a requester transmitting to a lock management system a request for a certain lock on a first resource;
    said lock management system denying said request based on a blocking condition that, while in effect, said lock management system does not grant a request for a lock on a second resource different than said first resource;
    said requester receiving from said lock management system a response that (1) denies said request for a certain lock on a first resource and (2) includes data that identifies the second resource; and said requester determining said blocking condition is no longer in effect by performing certain steps that include:
said requester transmitting to said lock management system a request for a lock on said second resource; and
said requester receiving from said lock management system a response that grants said request for said lock on said second resource.

2. The method of claim 1, wherein said second resource is a transaction and said first resource is a resource locked for said transaction.

3. The method of claim 2, wherein said data that identifies a second resource includes a transaction id identifying said transaction.

4. The method of claim 1, wherein:
said first resource is a data block; and
said blocking condition is based on said data block undergoing a block-split operation.

5. The method of claim 4, wherein said data block is marked to indicate the data block is undergoing said block split operation.

6. The method of claim 1, further including in response to determining when said blocking condition no longer prevents said lock management system from granting a lock on said first resource, said requester informing said lock management system that said blocking condition is no longer in effect.

7. The method of claim 1, further including said requester informing said lock management system that said blocking condition is no longer effect by making another request for a lock of said first resource, said request including data specifying that said blocking condition is no longer effect.

8. A non-transitory computer-readable medium storing one or more sequences of instructions, wherein execution of the one or more sequences of instructions by one or more processors causes the one or more processors to perform the steps of:
a requester transmitting to a lock management system a request for a certain lock on a first resource;
said lock management system denying said request based on a blocking condition that, while in effect, said lock management system does not grant a request for a lock on a second resource different than said first resource;
said requester receiving from said lock management system a response that (1) denies said request for a certain lock on a first resource and (2) includes data that identifies the second resource; and
said requester determining said blocking condition is no longer in effect by performing certain steps that include:
said requester transmitting to said lock management system a request for a lock on said second resource; and
said requester receiving from said lock management system a response that grants said request for said lock on said second resource.

9. The computer-readable medium of claim 8, wherein said second resource is a transaction and said first resource is a resource locked for said transaction.

10. The computer-readable medium of claim 9, wherein said data that identifies a second resource includes a transaction id identifying said transaction.

11. The computer-readable medium of claim 8, wherein:
said first resource is a data block; and
said blocking condition is based on said data block undergoing a block-split operation.

12. The computer-readable medium of claim 11, wherein said data block is marked to indicate the data block is undergoing said block split operation.

13. The computer-readable medium of claim 8, the steps further including in response to determining when said blocking condition no longer prevents said lock management system from granting a lock on said first resource, said requester informing said lock management system that said blocking condition is no longer in effect.

14. The computer-readable medium of claim 8, the steps further including said requester informing said lock management system that said blocking condition is no longer effect by making another request for a lock of said first resource, said request including data specifying that said blocking condition is no longer effect.

* * * * *

UNITED STATES PATENT AND TRADEMARK OFFICE
CERTIFICATE OF CORRECTION

| | | |
|---|---|---|
| PATENT NO. | : 8,086,579 B1 | Page 1 of 1 |
| APPLICATION NO. | : 10/056716 | |
| DATED | : December 27, 2011 | |
| INVENTOR(S) | : Chandrasekaran et al. | |

It is certified that error appears in the above-identified patent and that said Letters Patent is hereby corrected as shown below:

On Page 2, in column 2, under "Other Publications", line 23, below "Date Apr. 19, 2007." insert -- U.S. Appl. No. 10/965,360, filed Dec. 12, 2004, Office Action Mailing Date Feb. 26, 2007. --.

In column 3, line 15, delete "ISSAACS" and insert -- ISSACS --, therefor.

In column 3, line 59, after "block to" insert -- the b-tree --.

Figure 1:
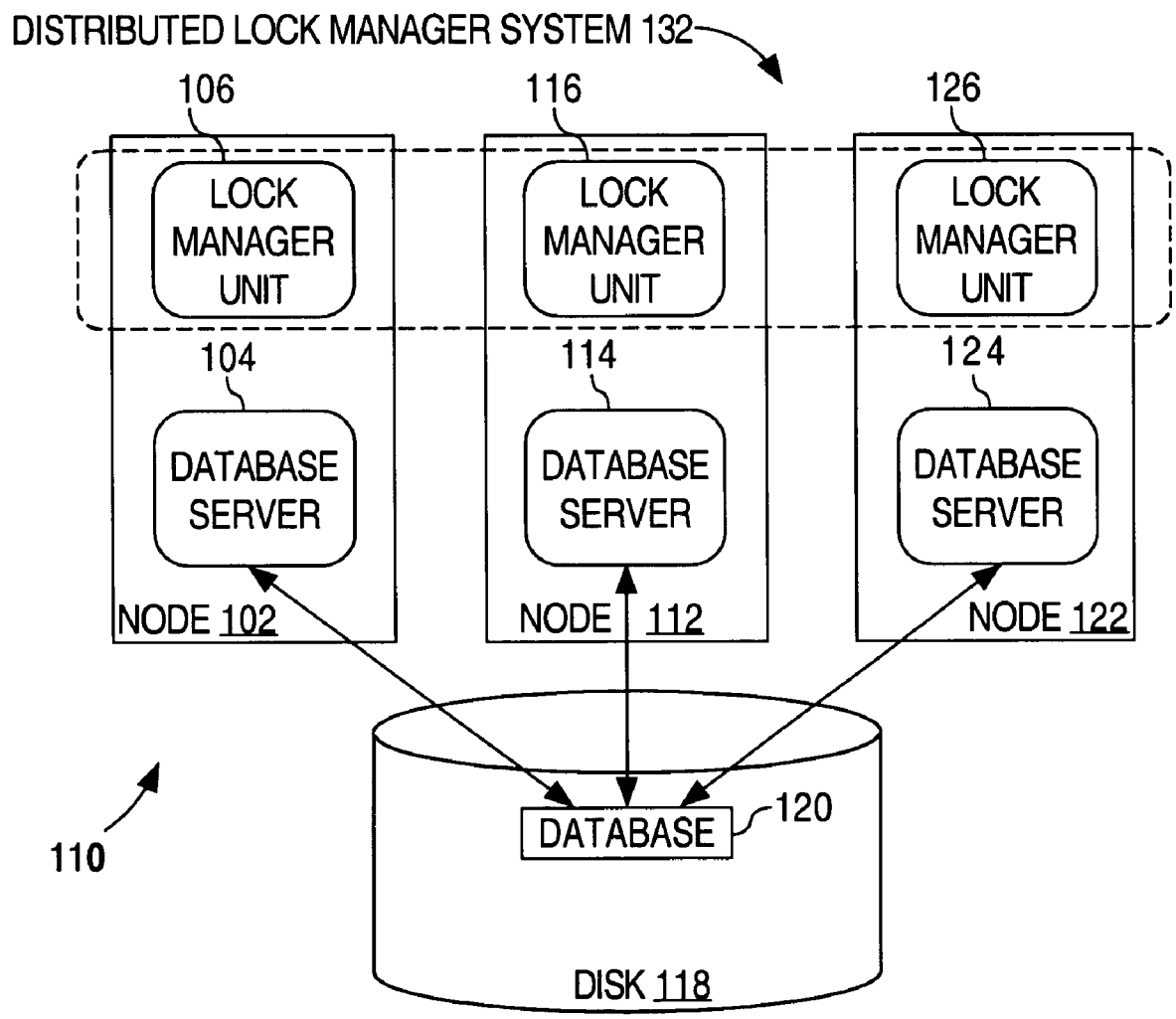
FIG. 1 is a block diagram depicting a distributed lock management system that may be used to implement an embodiment of the present invention.
Figure 2:
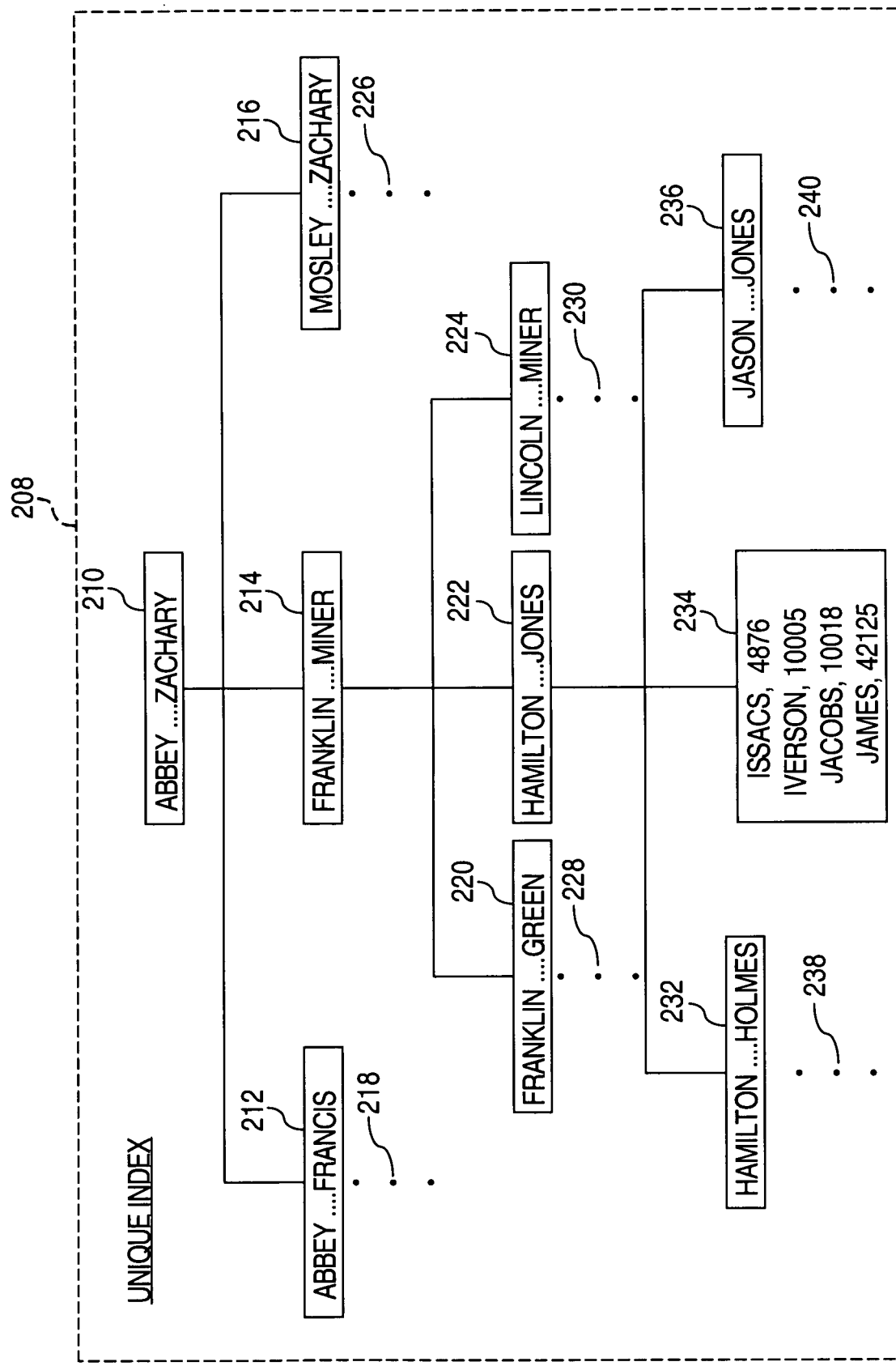
FIG. 2 is database b-tree index used to illustrate an embodiment of the present invention.
Figure 3:
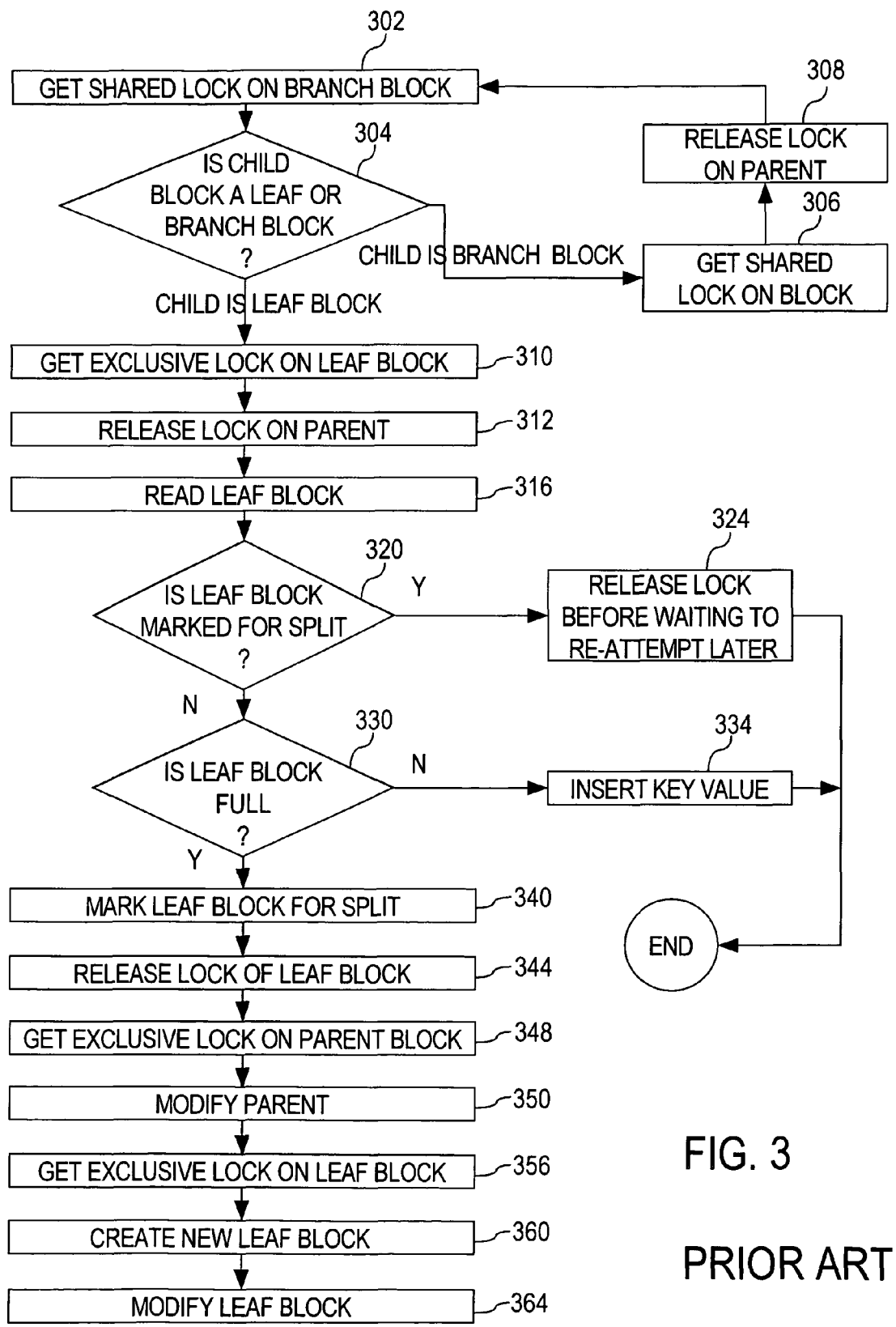
FIG. 3 is a flow chart depicting a protocol for inserting a key value into the b-tree index.

In column 4, line 23, below "index." insert -- FIG. 3 is a flowchart showing such a protocol for inserting a key value. The protocol illustrated is a simplified version of a protocol used in many distributed lock management systems or database systems. For example, the illustrated steps do not describe operations involving global locks that might be needed to acquire locks for some distributed lock management systems. Such details have been omitted for purposes of exposition. Also, the steps are illustrated by describing database processes that execute the steps. Each of the processes are executing a separate transaction. The present invention is not limited to use in the context of database processes executing transactions. --.

In column 12, line 57, in Claim 1, delete "A method, the method" and insert -- A method --, therefor.

Signed and Sealed this
Tenth Day of April, 2012

David J. Kappos
*Director of the United States Patent and Trademark Office*